US011996601B2

(12) United States Patent
Rozbicki et al.

(10) Patent No.: US 11,996,601 B2
(45) Date of Patent: May 28, 2024

(54) COAXIAL TO MICROSTRIP TRANSITIONAL HOUSING

(71) Applicant: MACOM Technology Solutions Holdings, Inc., Lowell, MA (US)

(72) Inventors: Andrzej Rozbicki, San Jose, CA (US); Paul Hogan, Burlington, MA (US); Gary Pepelis, Weare, NH (US); Scott Donahue, Lunenberg, MA (US)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 550 days.

(21) Appl. No.: 16/951,263

(22) Filed: Nov. 18, 2020

(65) Prior Publication Data

US 2022/0158320 A1 May 19, 2022

(51) Int. Cl.
*H01P 5/08* (2006.01)
*H01P 5/02* (2006.01)

(52) U.S. Cl.
CPC .............. *H01P 5/085* (2013.01); *H01P 5/028* (2013.01)

(58) Field of Classification Search
CPC ................................ H01P 5/085; H01P 5/028
See application file for complete search history.

(56) References Cited

U.S. PATENT DOCUMENTS 5,198,786 A * 3/1993 Russell .................... H01P 5/103 333/246
6,154,103 A * 11/2000 Scharen .................. H01P 5/085 333/260

* cited by examiner

*Primary Examiner* — Samuel S Outten
(74) *Attorney, Agent, or Firm* — Perilla Knox & Hildebrandt LLP; Jason M. Perilla

(57) ABSTRACT

Aspects of coaxial to microstrip transitional housings are described. In one example, a transitional housing includes a channel comprising sidewalls formed into the housing, and an opening formed at an end of the channel. The transitional housing also includes a plug that is fitted into the opening at an end of the channel. The plug has a flat surface positioned at the end of the channel, extending between the sidewalls of the channel, and an undercut below the flat surface. The transitional housing also includes a coaxial conductor aperture that extends from outside the housing, into the housing, into the plug, through the flat surface and undercut of the plug, and into the channel. Use of the plug offers a manufacturing solution for the mechanical and electrical transition between a coaxial feedthrough to a PCB microstrip secured within the housing. The solution helps to eliminate unwanted mismatches of the transition.

20 Claims, 12 Drawing Sheets

COAXIAL TO MICROSTRIP TRANSITIONAL HOUSING

BACKGROUND

Integrated modules for radio frequency (RF), microwave, and millimeter-wave frequencies often include a number of different types of transmission lines. The transmission lines provide electrical couplings for signals among components in the integrated modules. The integrated modules can include monolithic microwave integrated circuit (MMIC) modules, for example, contained in either hermetic or non-hermetic housings. Example signal paths in such integrated modules include coaxial cables, printed circuit board (PCB) microstrip lines, coaxial glass feedthroughs, waveguides, other signal and wave conductors, and combinations thereof.

Transitions between coaxial cables and PCB microstrip lines, as one example, are common features of microwave and millimeter-wave systems. Various electrical and mechanical arrangements have been proposed to maintain bandwidth at the transitions between coaxial cables and microstrip lines. Improvements in the transitions have sought to enhance the performance of microwave and millimeter-wave systems. However, engineers face mechanical and electrical problems in the design of transitions between coaxial cables and microstrip lines.

SUMMARY

Aspects of coaxial to microstrip transitional housings are described. In one example, a transitional housing includes a channel comprising sidewalls formed in the housing and an opening formed at an end of the channel. The transitional housing also includes a plug in the opening at an end of the channel. The plug has a surface positioned at the end of the channel, extending between the sidewalls of the channel. The transitional housing also includes a feedthrough aperture that extends through the housing, through the surface of the plug, and into the channel. In another example, a transitional housing includes a housing block and a plug. The housing block includes a channel having parallel sidewalls formed in the housing block and an opening in the housing block at an end of the channel. The plug fits in the opening of the housing block. The plug includes a flat surface positioned at the end of the channel, with the flat surface extending between the parallel sidewalls of the channel. The housing block further includes a feedthrough aperture that extends through the housing block, through the flat surface of the plug, and into the end of the channel.

In other aspects, the housing block includes a cover recess formed in the housing block from an outer surface of the housing block. The cover recess includes a cover platform surface. The channel is formed from the cover platform surface to a first depth into the housing block, and the opening is formed from the cover platform surface to a second depth into the housing block. The second depth can be greater than the first depth in one example.

In other aspects, the opening in the housing block can be an annular opening, and the plug can be a cylindrical plug. The plug can also include an undercut and a platform ledge. The platform ledge of the plug can be in a same plane as a bottom surface of the channel in one example.

In another example, the transitional housing can also include a second opening formed into the housing block at a second end of the channel, and a second plug fitted into the second opening of the housing block. The second plug can include a second flat surface positioned at the second end of the channel, with the second flat surface extending between the parallel sidewalls of the channel. The transitional housing can also include a second feedthrough aperture that extends through the housing block, through the second flat surface of the second plug, and into the second end of the channel.

In other aspects, the transitional housing can also include a coaxial feedthrough positioned within the feedthrough aperture, and a microstrip line formed on a printed circuit board. The printed circuit board can be positioned on a bottom surface of the channel. The plug can include an undercut and a platform ledge, and one end of the printed circuit board can rest in part on the platform ledge of the plug and abut the coaxial feedthrough.

In another example, a coaxial to microstrip transitional housing includes a housing block and a cylindrical plug. The housing block includes a channel having parallel sidewalls formed to a first depth into the housing block, and an annular opening formed to a second depth into the housing block at an end of the channel. The cylindrical plug is fitted into the annular opening of the housing block. The cylindrical plug includes a first flat chord surface positioned at the end of the channel, with the first flat chord surface extending perpendicularly between the parallel sidewalls of the channel, and a second flat chord surface set back from the end of the channel. The housing block further includes a feedthrough aperture that extends from outside the housing block, through the first flat chord surface of the cylindrical plug, through the second flat chord surface of the cylindrical plug, and into the end of the channel.

In another example, a method of forming a transitional housing includes one or more of providing a housing block for the transitional housing, forming a channel into the housing block, forming an annular opening at a first end of the channel, fabricating a cylindrical plug for insertion into the annular opening, the cylindrical plug comprising a flat chord surface, and inserting the cylindrical plug into the annular opening of the housing block. The method can also include forming a feedthrough aperture that extends from outside the housing block, through the flat chord surface of the cylindrical plug, and into an end of the channel. The method can also include resurfacing the housing block and the cylindrical plug to form an outer surface of the transitional housing, and forming a cover recess into the outer surface of the transitional housing and the cylindrical plug.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
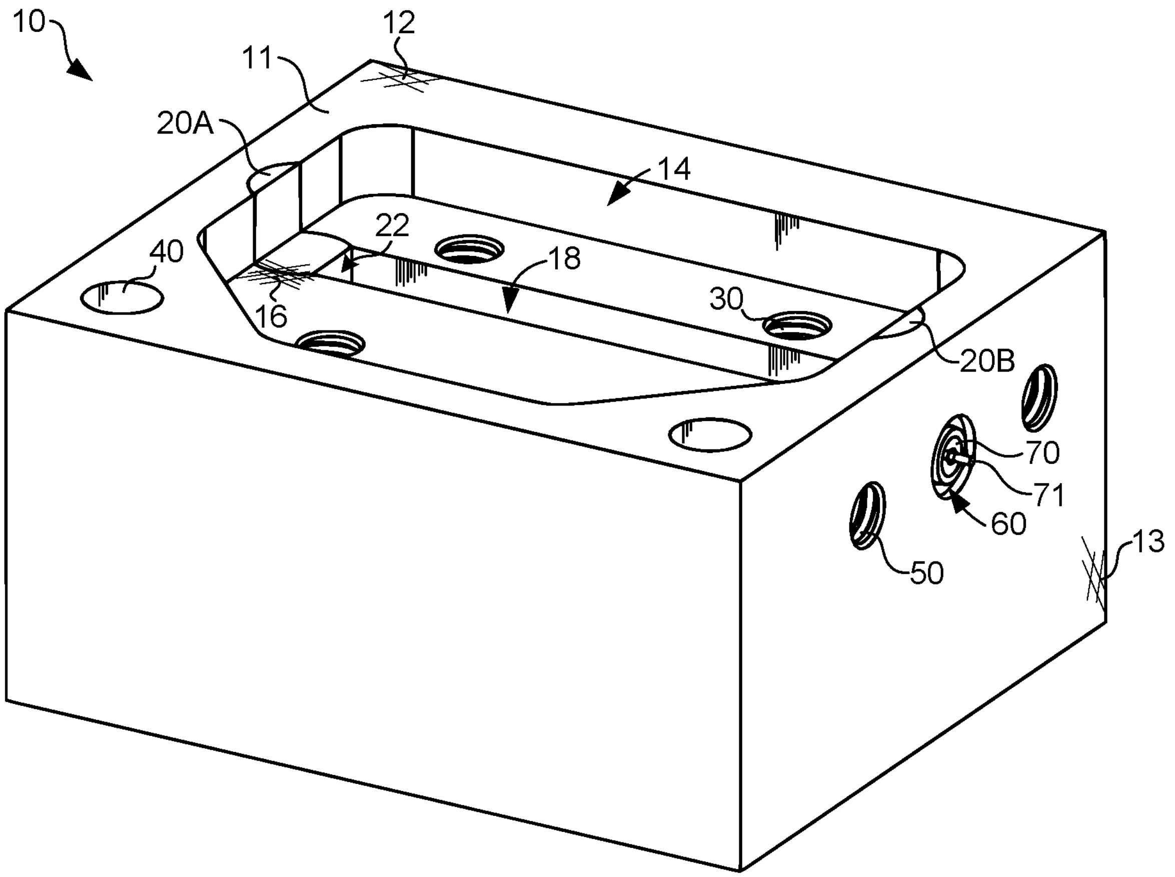
FIG. 1A illustrates a perspective view of an example coaxial to microstrip transitional housing according to various embodiments of the present disclosure.

As noted above, transitions between coaxial cables and microstrip lines are common features of microwave and millimeter-wave systems. A number of different electrical and mechanical arrangements have been proposed to maintain the bandwidth at the transitions. Improvements in the transitions have sought to enhance the performance of microwave and millimeter-wave systems.

Coaxial glass feedthroughs support propagation of electromagnetic waves in transverse electromagnetic (TEM) mode, whereas a PCB microstrip line supports quasi-TEM propagation mode. A transition between the coaxial glass feedthrough and the microstrip line represents a transition from the TEM mode of the coaxial transmission line to the quasi-TEM mode of the microstrip transmission line. Conventional solutions for the transition have included an abrupt transition between the coaxial glass feedthrough and the microstrip line. These abrupt transitions have resulted in significant impedance mismatches and path discontinuities for TEM propagation mode. The abrupt transitions can generate unwanted spurious or "parasitic-mode" signals, which can interfere with the quasi-TEM mode signals of the microstrip transmission lines and the associated circuitry. A gradual transition between the feedthrough and the microstrip line would lower the impedance mismatch and reduce the TEM propagation mode discontinuity. It has, however, been relatively difficult to practically design and manufacture a gradual transition.

Electromagnetic waves propagating from a coaxial feedthrough to a PCB microstrip line not only transition from the TEM mode to the quasi-TEM mode, but the waves will also transition from the polar orientation of the coaxial feedthrough to the planar orientation of the microstrip line. Even well-designed coaxial-to-microstrip transitions invariably impart an electrical discontinuity of impedances. The extent of the discontinuity depends on several factors, including the mechanical and electrical variations at the transition. Any impedance mismatches at the coaxial-to-microstrip transition can result in signal reflections and radiation at the transition. Additionally, differences between the signal path and the ground return path can lead to electromagnetic wave skew, distortions, and result in additional sources for spurious mode propagation.

The concepts and embodiments described herein are designed to reduce the unwanted transitional effects described above, among other unwanted effects. One aspect of the solution is to use a plug at the transition in a housing between a coaxial glass feedthrough and a PCB microstrip line secured within the housing. The plug offers a solution for a mechanical transition to partially eliminate the unwanted impedance mismatch of the transition. The plug also provides a mechanical path for TEM mode propagation for the coaxial-to-microstrip signal path transition. The embodiments described herein can be relied upon to substantially improve the quality of high frequency signals.

Thus, various aspects of coaxial to microstrip transitional housings are described herein. In one example, a transitional housing includes a channel comprising sidewalls formed in the housing, and an opening formed at an end of the channel. The transitional housing also includes a plug that fits in the opening at an end of the channel. The plug has a flat surface positioned at the end of the channel, extending between the sidewalls of the channel, and an undercut below the flat surface. The transitional housing also includes an aperture that extends from outside the housing, through the plug, and into the channel.

Figure 1B:
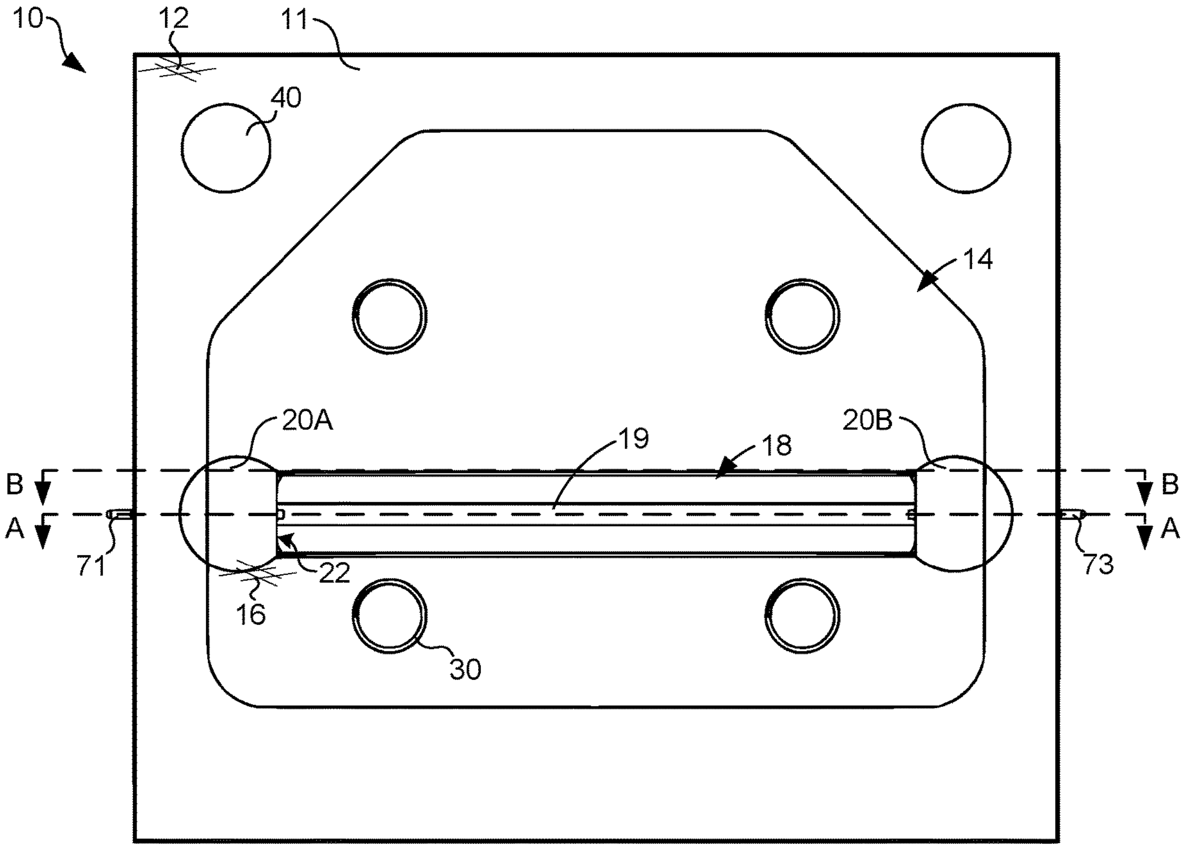
FIG. 1B illustrates a top-down view of the transitional housing shown in FIG. 1A according to various embodiments of the present disclosure.
Figure 1C:
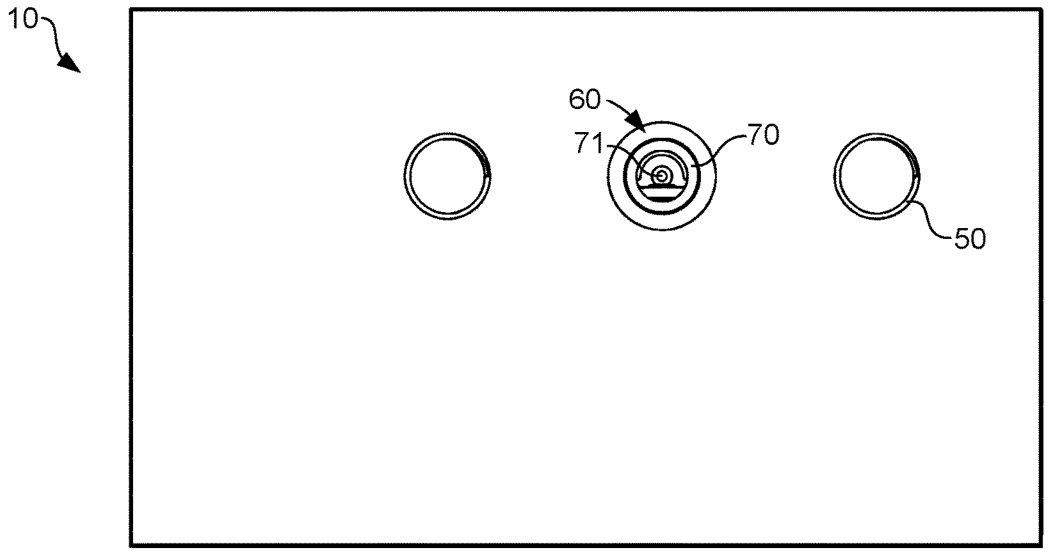
FIG. 1C illustrates a side view of the transitional housing shown in FIG. 1A according to various embodiments of the present disclosure.

Turning to the drawings, FIG. 1A illustrates a perspective view of an example coaxial to microstrip transitional housing 10, FIG. 1B illustrates a top-down view of the housing 10, and FIG. 1C illustrates a side view of the housing 10 according to various embodiments of the present disclosure. The housing 10 is illustrated as a representative example for the purpose of discussion. The housing 10 is not drawn to any particular scale in FIGS. 1A-1C. The shapes, sizes, proportions, and other characteristics of the features of the housing 10 can vary among the embodiments. The concepts described herein can be extended to other types of transitional housings and are not limited to use with any particular shape, size, or style of transitional housing.

Referring among FIGS. 1A-1C, the housing 10 includes a housing block 11. The housing block 11 can be formed from a single block of material, such as aluminum or other metal or metal alloy, a polymer, a composite material, or other suitable material(s). The housing block 11 has a number of outer surfaces, including top surface 12 and right side surface 13, among others, as shown in the example.

The housing 10 includes a cover recess 14. The cover recess 14 can be formed into the housing 10 from the top surface 12. The cover recess 14 includes a cover platform surface 16 within the housing 10. The shape of the cover recess 14 is provided as a representative example in FIGS. 1A-1C, and the shape and size of the cover recess 14 can vary among the embodiments. When the housing 10 is fully assembled, a cover (not shown) can be placed in cover recess 14, as described in further detail below.

The housing 10 also includes a channel 18 having sidewalls formed into the housing block 11, extending down from the cover platform surface 16. The sidewalls of the channel 18 can extend parallel or substantially parallel to each other in certain embodiments. The sidewalls of the channel 18 can be formed to be parallel to each other to the substantial extent possible using the available manufacturing techniques, given manufacturing tolerances. Other terms used herein, such as flat, chord, perpendicular, cylindrical, circular, square, and rectangular, among others, are also qualified in geometry by the substantial precision afforded using the available manufacturing techniques, as would be understood in the art.

The housing 10 also includes a first cylindrical plug 20A and a second cylindrical plug 20B. The first cylindrical plug 20A fits in a first annular opening formed in the housing 10 at a first end of the channel 18. The second cylindrical plug 20B fits in a second annular opening formed in the housing 10 at a second end of the channel 18. As shown in FIG. 1A, the cylindrical plug 20A includes a flat chord surface 22. The flat chord surface 22 is positioned at the first end of the channel 18, with the flat chord surface 22 extending perpendicularly between the parallel sidewalls of the channel 18. The cylindrical plug 20B includes a flat surface similar to the flat chord surface 22, which is positioned at the second end of the channel 18 and extends perpendicularly between the parallel sidewalls of the channel 18, as described in further detail below. In one case, the cylindrical plugs 20A and 20B can be formed from the same material(s) as the housing block 11, to match thermal properties (e.g., expansion, contraction, etc.) among the materials for practical applications in the field. In other examples, the cylindrical plugs 20A and 20B and the housing block 11 can be formed from different materials.

The housing 10 may include a number of threaded holes 30. The threaded holes 30 can be relied upon to secure a cover for the housing 10 within the cover recess 14 using screws or other fasteners. The cover can enclose and seal the housing 10. The threaded holes 30 extend into, but not through the housing block 11. Four threaded holes 30 are shown (see FIG. 1B), but any suitable number of threaded holes can be used. Additionally, the placement of the threaded holes 30 is shown as an example, and the threaded holes 30 can be positioned at other locations over the cover platform surface 16.

The housing 10 includes a number of apertures 40 formed from the top surface 12 into the housing block 11. The apertures 40 extend through the housing block 11. Thus, screws or other fasteners can be inserted through the apertures 40 to hold the housing 10 at a location in a larger assembly. Two apertures 40 are shown (see FIGS. 1A & 1B), but any suitable number of mounting apertures can be relied upon among the embodiments. Additionally, the placement of the apertures 40 is shown as an example, and the apertures 40 can be positioned at other locations.

The housing 10 includes a number of threaded holes 50 formed from the right side surface 13 into the housing block 11. The threaded holes 50 can be relied upon to secure a connector or other housing for a coaxial cable to the side of the housing 10 using screws or other fasteners. The threaded holes 50 extend a distance into but do not extend through the housing block 11. Two threaded holes 50 are shown (see FIG. 1A) on a right side of the housing 10, but any suitable number of threaded holes can be relied upon among the embodiments. The placement of the threaded holes 50 is shown as an example, and the threaded holes 50 can be positioned at other locations. Additionally, the housing 10 can include threaded holes similar to the threaded holes 50 on a left side of the housing 10.

The housing 10 also includes a feedthrough aperture 60 formed from the right side surface 13 into the housing block 11. The feedthrough aperture 60 is formed to seat and secure a coaxial feedthrough 70 within the side of the housing block 11, as shown in FIGS. 1A and 1C. At its center, the feedthrough aperture 60 extends through a portion of the housing block 11 and through a portion of the cylindrical plug 20B. The feedthrough aperture 60 opens at one end of the channel 18, as also described in further detail below. The housing 10 also includes another feedthrough aperture 62 (see FIG. 8) similar to the feedthrough aperture 60, but positioned on the left side of the housing 10, and another coaxial feedthrough 72 (see FIG. 2B) is secured within it.

Referring to FIG. 1B, a microstrip line 19 on a PCB is positioned within (and rests at the bottom surface of) the channel 18. The coaxial feedthrough 70, which can be a hermetic coaxial glass feedthrough in one example, includes a central conductor 71. The central conductor 71 provides a first conductive pathway from outside the housing 10, extends through a portion of the housing 10 and the cylindrical plug 20B, and also extends into the channel 18 for electrical contact with one end of the microstrip line 19. Similarly, at the other side of the housing 10, a central conductor 73 of the coaxial feedthrough 72 provides a second conductive pathway from outside the housing 10, through a portion of the housing 10 and the cylindrical plug 20A, and into the channel 18 for electrical contact with another end of the microstrip line 19.

The central conductor 71 can be electrically coupled to the one end of the microstrip line 19, and the central conductor 73 can be electrically coupled to the other end of the microstrip line 19, using solder or other suitable means. Thus, the housing 10 includes two mechanical and electrical transitions between the coaxial feedthroughs 70 and 72 and the microstrip line 19. As noted above, for RF, microwave, and millimeter-wave frequency signals, the transitions are associated with a shift from the TEM mode of the coaxial feedthroughs 70 and 72 to the quasi-TEM mode of the microstrip line. Conventional solutions for the transition have included relatively abrupt transitions between coaxial feedthroughs and microstrip lines. These abrupt transitions have resulted in impedance mismatches and path discontinuities for TEM propagation mode. The abrupt transitions can generate unwanted spurious or "parasitic-mode" signals, which can interfere with the quasi-TEM mode signals of the microstrip lines, among other problems.

As described in additional detail below, the housing 10 includes a number of design features and elements that can reduce the unwanted transitional effects described above, among other unwanted effects. One aspect of the solution is the use of the cylindrical plugs 20A and 20B at the transitions between the coaxial feedthroughs 70 and 72 and the microstrip line 19 within the channel 18 of the housing 10. The cylindrical plugs 20A and 20B include certain surfaces, undercuts, and other features for a better mechanical and electrical transition with the channel 18 and the microstrip line 19, to help reduce the unwanted mismatches of the transition. The cylindrical plugs 20A and 20B also provide a mechanical path for TEM mode propagation for the coaxial-to-microstrip signal path transition. The embodiments described herein substantially improve the propagation of high frequency signals both into and out of the housing 10, among other benefits.

Figure 2A:
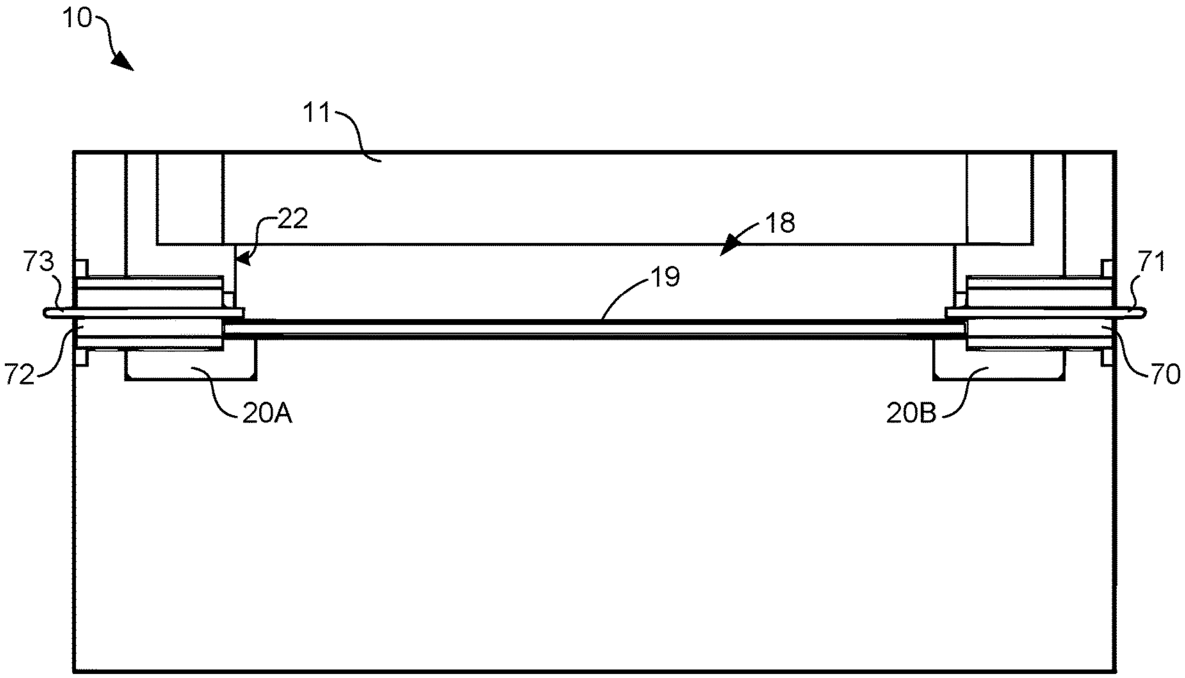
FIG. 2A illustrates a cross-section of the transitional housing designated as "A-A" in FIG. 1B according to various embodiments of the present disclosure.

FIG. 2A illustrates a cross-section of the housing 10 designated as "A-A" in FIG. 1B according to various embodiments of the present disclosure. As shown, the microstrip line 19 is positioned within the channel 18 in the housing block 11 of the housing 10. The central conductor 71 of the coaxial feedthrough 70 provides a first conductive pathway from outside the housing 10, through a portion of the housing 10 and the cylindrical plug 20B, and into the channel 18 for electrical contact with one end of the microstrip line 19. Similarly, the central conductor 73 of the coaxial feedthrough 72 provides a second conductive pathway from outside the housing 10, through a portion of the housing 10 and the cylindrical plug 20A, and into the channel 18 for electrical contact with another end of the microstrip line 19. The central conductor 71 is electrically coupled to the one end of the microstrip line 19, and the central conductor 73 is electrically coupled to the other of the microstrip line 19, using solder or other suitable means. Thus, the housing 10 includes two mechanical and electrical transitions between the coaxial feedthroughs 70 and 72 and the microstrip line 19.

Figure 2B:
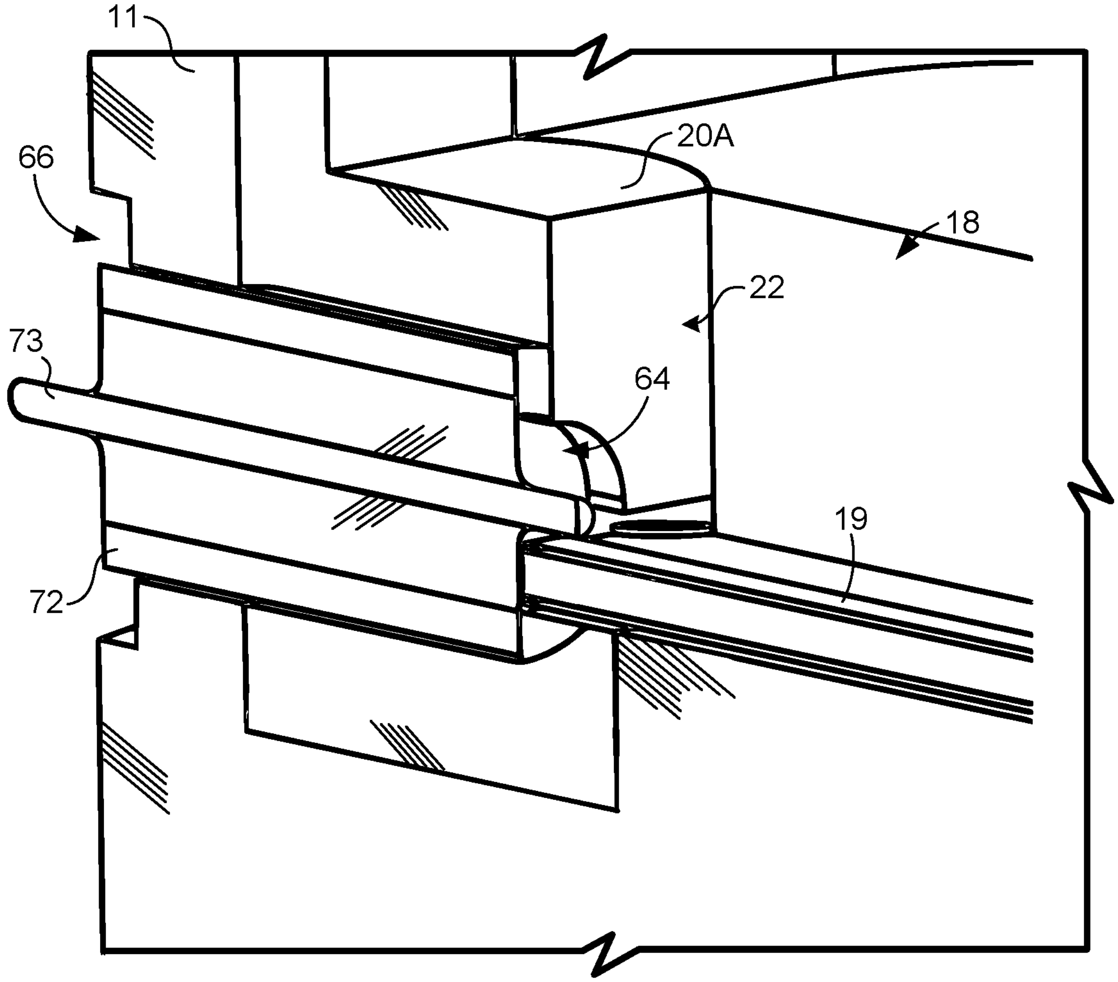
FIG. 2B illustrates a perspective view of a portion of the cross-section shown in FIG. 2A according to various embodiments of the present disclosure.

FIG. 2B illustrates a perspective view of a portion of the cross-section shown in FIG. 2A. As shown, the coaxial feedthrough 72 is seated within a feedthrough aperture 62 (see FIG. 8) of the housing block 11. As described in further detail below, the feedthrough aperture 62 comprises a coaxial conductor aperture 64 of a first diameter, a feedthrough hole 68 (see FIG. 8) of a second diameter, and a feedthrough ring 66 of a third diameter. The coaxial feedthrough 72 is positioned and seated within the feedthrough hole 68. The feedthrough aperture 62 is formed into the housing block 11 during a number of primary machining steps, as described below. The central conductor 73 of the coaxial feedthrough 72 provides a conductive pathway from outside the housing 10, through a portion of the housing 10 and the cylindrical plug 20A, and into the channel 18 for electrical contact with the microstrip line 19.

Figure 2C:
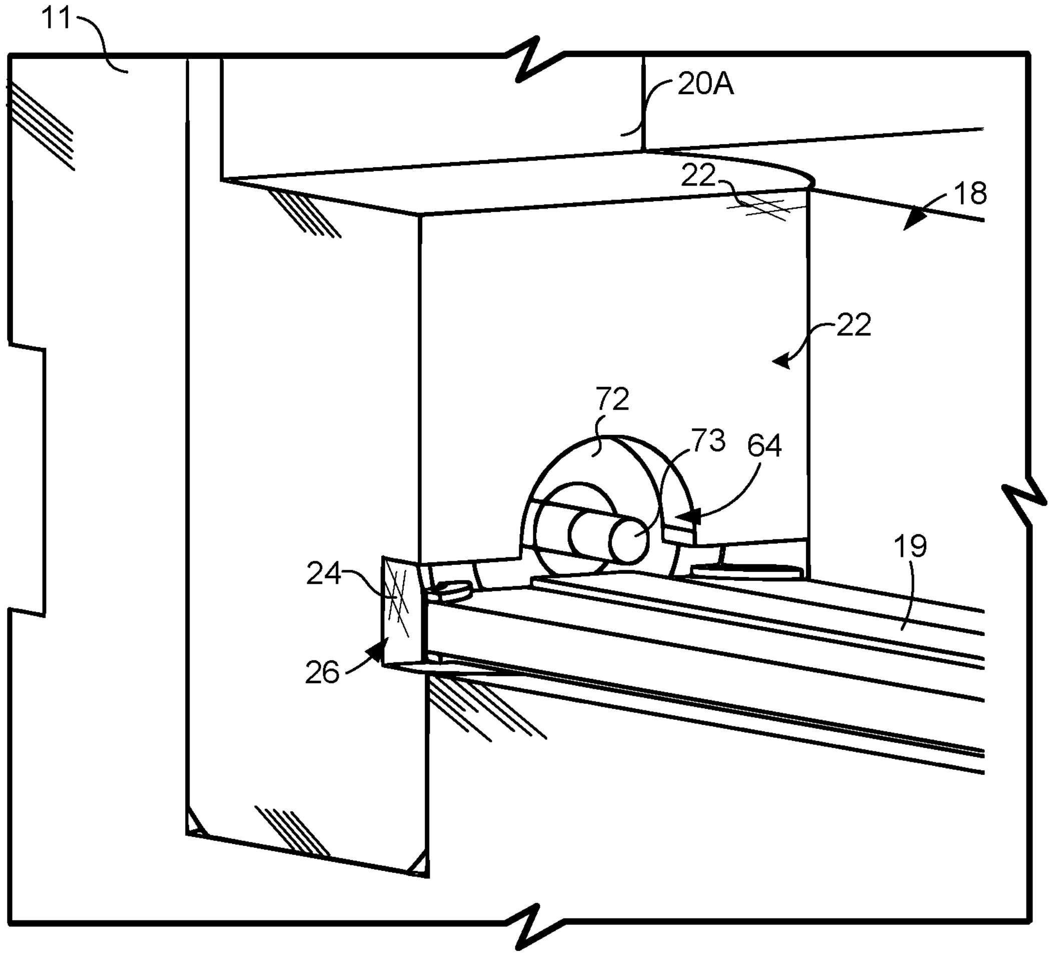
FIG. 2C illustrates a perspective view of a portion of the cross-section designated as "B-B" in FIG. 1B according to various embodiments of the present disclosure.

Additional features of the cylindrical plug 20A are shown in FIG. 2C. FIG. 2C illustrates a perspective view of the cross-section designated as "B-B" in FIG. 1B. The cylindrical plug 20A includes a flat chord surface 22 and a flat chord surface 24. The flat chord surface 24 is formed at the back of the undercut 26 in the cylindrical plug 20A. In the housing 10, the cylindrical plug 20A is positioned at the end of the channel 18, such that the flat chord surface 22 extends substantially perpendicular to and between the parallel sidewalls of the channel 18. The flat chord surface 24 also extends perpendicular to the parallel sidewalls of the channel 18. Although not shown, the cylindrical plug 20B includes features similar to the cylindrical plug 20A, and the cylindrical plug 20B interfaces with the other end of the channel 18 in a manner similar to that shown in FIG. 2C.

As shown in FIG. 2C, one end of the PCB for the microstrip line 19 extends into the undercut 26 of the cylindrical plug 20A, abutting an end of the coaxial feedthrough 72, under the central conductor 73 of the coaxial feedthrough 72. Space or distance between the end of the coaxial feedthrough 72 and the end of the microstrip line 19 can be minimized or nearly eliminated in the arrangement shown. Additionally, the flat chord surfaces 22 and 24 of the cylindrical plug 20A provide square corners at the end of the channel 18. It would be very difficult, if even possible, to directly form the square corners at the end of the channel 18 in the housing block 11 using conventional machining and manufacturing techniques without the use of the cylindrical plug 20A. Further, in some embodiments, coaxial conductor aperture 64 has a semi-circular shape that helps to minimize electromagnetic resonances and facilitate the transition from the TEM mode of the coaxial feedthrough 72 to the quasi-TEM mode of the microstrip line 19.

A method of manufacture of the housing 10 is described below with reference to the remaining figures. The steps are described in a particular order, although the order of one or more of the steps can vary as compared to that described. Certain manufacturing, machining, and tooling processes and are described in connection with the steps, but other suitable techniques can be relied upon to form the housing 10. Also, one or more of the steps, such as forming threaded openings, can be repeated a number of times, as needed based on the application for the housing 10. One or more of the steps can also be skipped or omitted entirely depending on the application for the housing 10. Additionally, while the steps are described in connection with the manufacture of the housing 10, the steps (or similar steps) can be relied upon to manufacture other types of housings that incorporate the concepts described herein.

Figure 3:
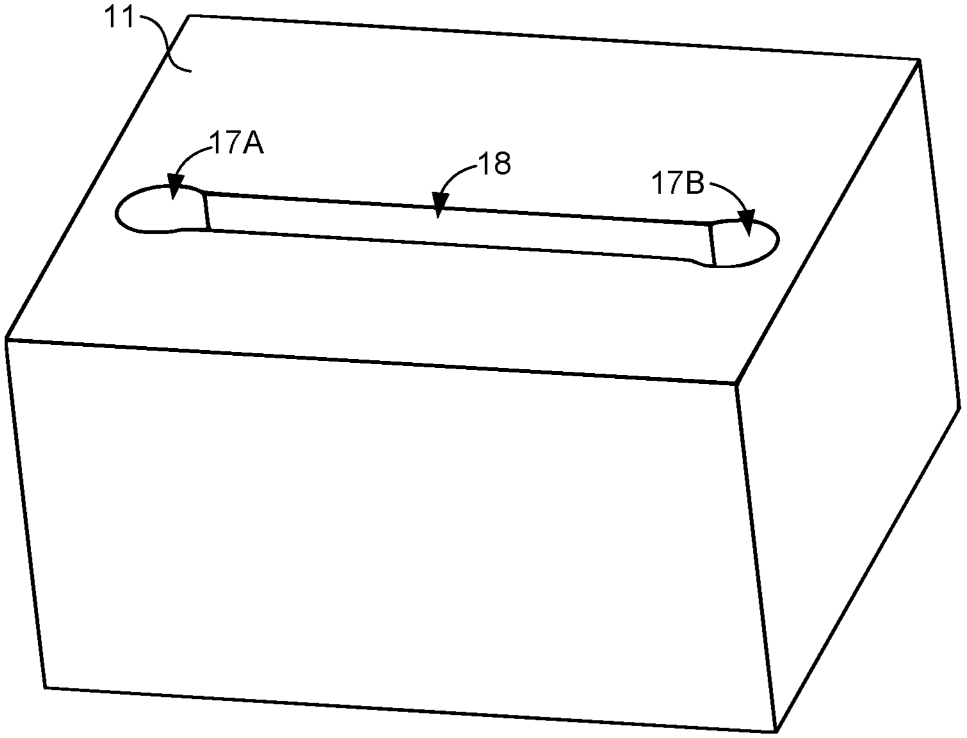
FIG. 3 illustrates a housing block with channel and annular openings for the transitional housing according to various embodiments of the present disclosure.

FIG. 3 illustrates the housing block 11 during a preparatory stage for the housing 10. The method of manufacturing can include providing the housing block 11. The housing block 11 can be formed from a single block of material of any suitable size, such as aluminum or other metal or metal alloy, a polymer, a composite material, or other suitable material(s). The housing block 11 has a number of surfaces, including top, bottom, front, back, right, and left side surfaces.

A number of preparatory steps are performed on the housing block 11. The preparatory steps include forming the channel 18 into the housing block 11, from a top surface of the housing block 11. For example, the channel 18 can be milled or machined to a first depth into the housing block 11, as measured from the top surface of the housing block 11, using any suitable machining tools and techniques. The channel 18 can be formed to any suitable width, depending primarily upon the size of the PCB microstrip line to be seated into the channel 18, although other factors can be considered to determine a suitable width of the channel 18.

The preparatory machining steps also include forming a first annular opening 17A into the housing block 11 at a first end of the channel 18 and forming a second annular opening 17B into the housing block 11 at a second, opposite end of the channel 18. The first annular opening 17A and the second annular opening 17B can be formed by drilling in one example, although other techniques can be used. The annular openings 17A and 17B can be formed to any suitable diameter or size, depending primarily upon the width of the channel 18, although other factors can be considered. The annular openings 17A and 17B can be formed to a second depth into the housing block 11, as measured from the top surface of the housing block 11, using any suitable tools and techniques. The second depth of the annular openings 17A and 17B can be larger than the first depth of the channel 18, to provide sufficient space for insertion of the cylindrical plugs 20A and 20B and the alignment of the undercuts in the cylindrical plugs 20A and 20B with the bottom surface of the channel 18. As described below with reference to FIGS. 4A and 4B, the bottom end of the cylindrical plugs 20A and 20B can be sized to correspond to the difference between the first depth of the channel 18 and the second depth of the annular openings 17A and 17B.

Figure 4A:
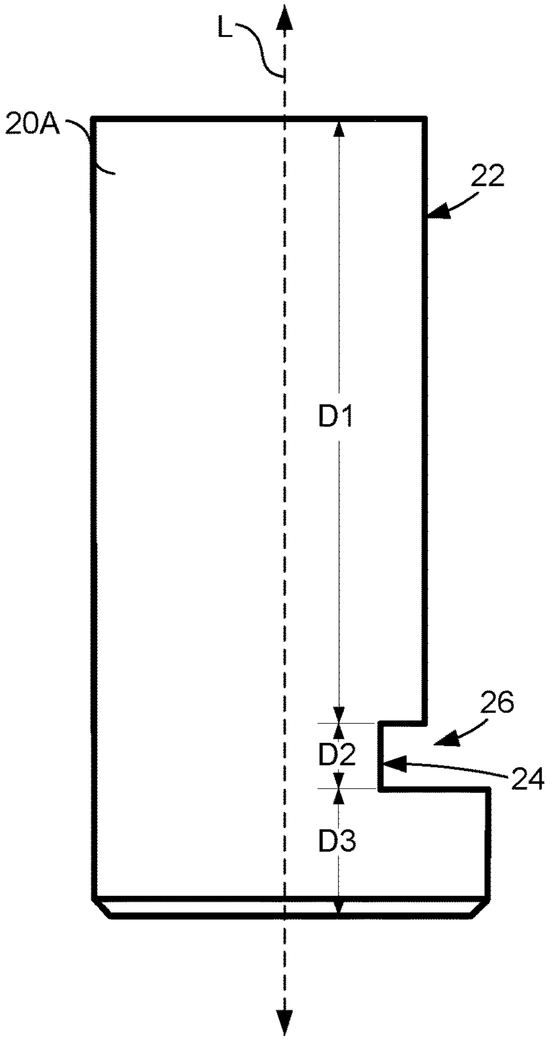
FIG. 4A illustrates a side view of a cylindrical plug for the transitional housing according to various embodiments of the present disclosure.
Figure 4B:
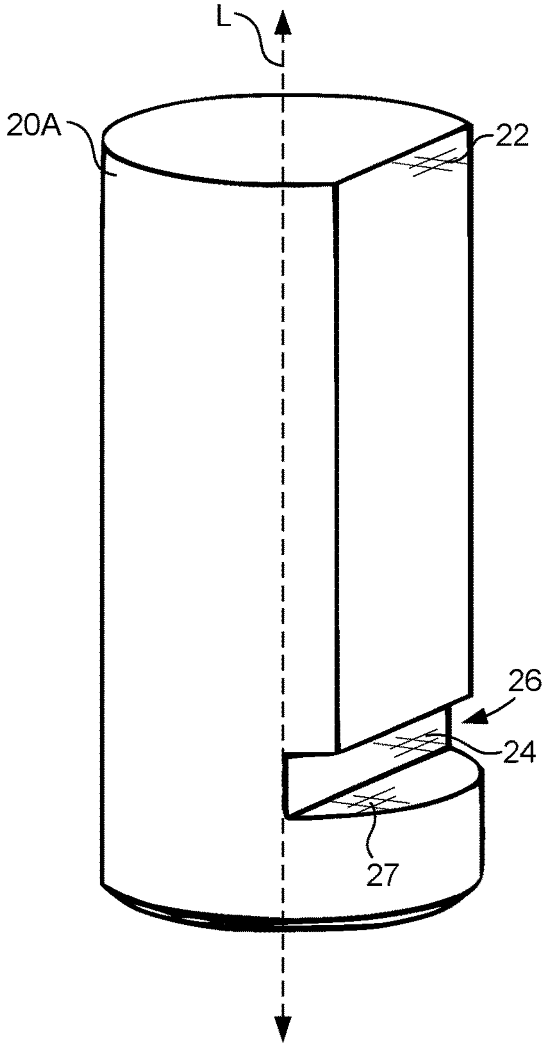
FIG. 4B illustrates a perspective view of the cylindrical plug shown in FIG. 4A according to various embodiments of the present disclosure.

FIG. 4A illustrates a side view of the cylindrical plug 20A for the housing 10, and FIG. 4B illustrates a perspective view of the cylindrical plug 20A according to various embodiments of the present disclosure. The cylindrical plug 20A can be separately fabricated before being inserted into one of the annular openings 17A and 17B (see FIG. 3) in the housing block 11, as described below. The cylindrical plug 20B can also be separately fabricated the same as the cylindrical plug 20A and inserted into another one of the annular openings 17A and 17B. The diameter of the cylindrical plug 20A corresponds to (i.e., is substantially the same as) the diameter of the annular openings 17A and 17B. Thus, the cylindrical plugs 20A and 20B are formed for tight press-fits into the annular openings 17A and 17B, to maintain a hermetic seal for the housing 10 in at least some embodiments.

The cylindrical plug 20A includes a first flat chord surface 22 that extends a distance D1 from one end of the cylindrical plug 20A to a first point along a longitudinal axis L of the cylindrical plug 20A. The cylindrical plug 20A also includes a second flat chord surface 24 that extends a distance D2 from the first point to a second point along the longitudinal axis L. The undercut 26 is formed in the cylindrical plug 20A, as the second flat chord surface 24 is recessed deeper into the cylindrical plug 20A than the first flat chord surface 22. The cylindrical plug 20A also has a flat platform ledge 27 that extends from the second flat chord surface 24 at the second point to the outer annular periphery of the cylindrical plug 20A, along a plane transverse to the longitudinal axis L. The features of the cylindrical plug 20A (and cylindrical plug 20B), including the flat chord surface 22, the flat chord surface 24, and the flat platform ledge 27 can be formed using any suitable machining tools and techniques.

When the cylindrical plug 20A is inserted into the annular opening 17A in the housing block 11, the bottom end of the cylindrical plug 20A that extends the distance D3 past the flat platform ledge 27 occupies the space between the first depth of the channel 18 and the second depth of the annular opening 17A. In this arrangement, the flat platform ledge 27 is aligned in the same plane as the bottom surface of the channel 18. In other words, the distance D3 is substantially the same as the difference between the first depth of the channel 18 and the second depth of the annular opening 17A. When the PCB on which the microstrip line 19 is formed is inserted into the channel 18, the end of the PCB can rest in part upon the flat platform ledge 27. This arrangement is described in further detail below with reference to FIG. 6.

Figure 5:
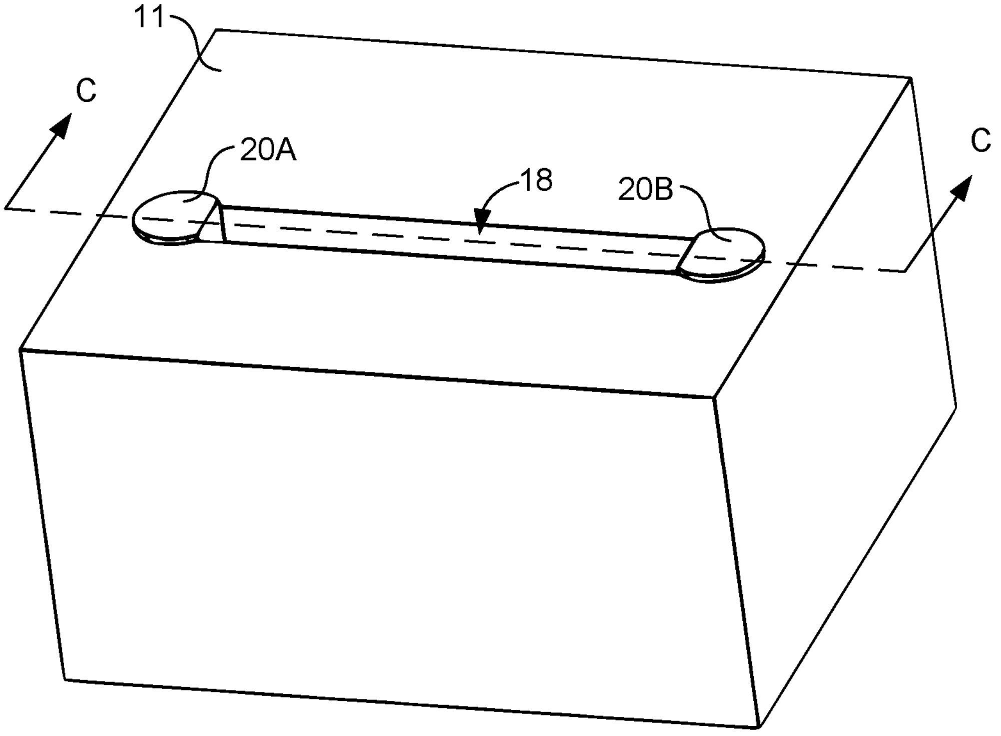
FIG. 5 illustrates the housing block for the transitional housing with the cylindrical plugs fitted into the annular openings of the housing block according to various embodiments of the present disclosure.

FIG. 5 illustrates the housing block 11 for the housing 10 with the cylindrical plugs 20A and 20B fitted into the annular openings 17A and 17B of the housing block 11. The method of manufacture of the housing 10 includes inserting the cylindrical plug 20A into the first annular opening 17A of the housing block 11, and inserting the cylindrical plug 20B into the second annular opening 17B of the housing block 11, as shown in FIG. 5. From this step in the method, a number of primary machining steps can be performed on the housing block 11 with the cylindrical plugs 20A and 20B fitted into the housing block 11.

Figure 6:
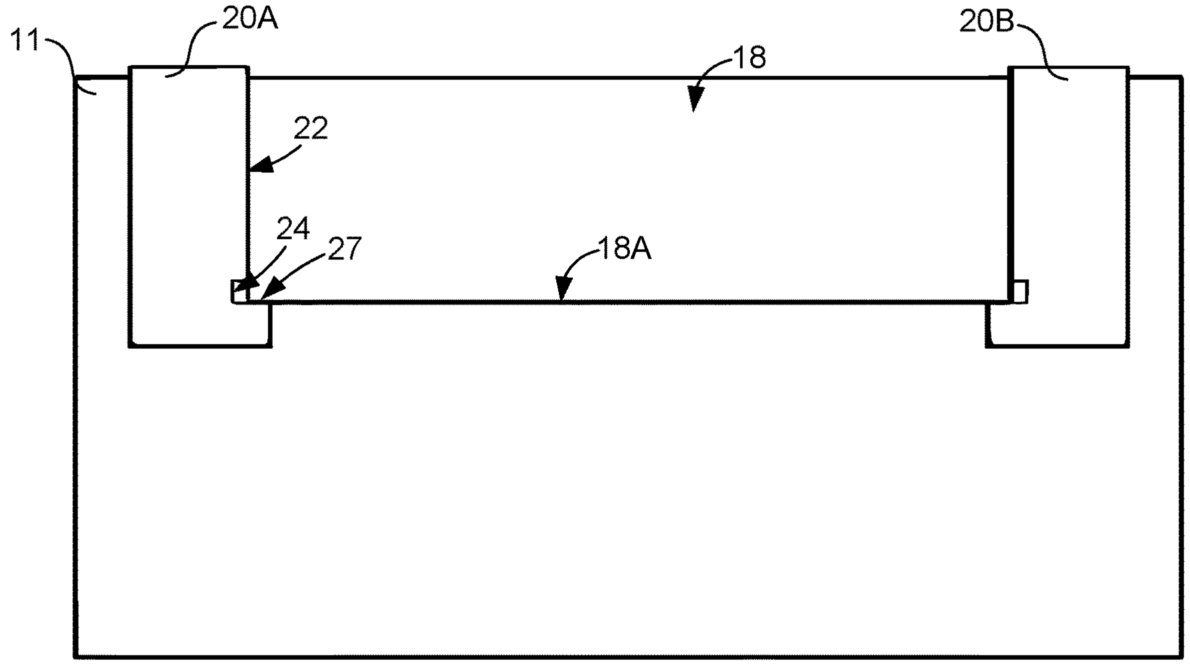
FIG. 6 illustrates the cross-section of the housing block and cylindrical plugs designated as "C-C" in FIG. 5 according to various embodiments of the present disclosure.

FIG. 6 illustrates the cross-section of the housing block 11 designated as "C-C" in FIG. 5. As shown, the cylindrical plugs 20A and 20B are inserted into the annular openings 17A and 17B in the housing block 11. The flat platform ledge 27 of the cylindrical plug 20A is aligned in the same plane as the bottom surface 18A of the channel 18, and the features of the cylindrical plug 20B are aligned similarly. The end of the PCB can rest on the flat platform ledge 27 when it is inserted into the channel 18.

Figure 7:
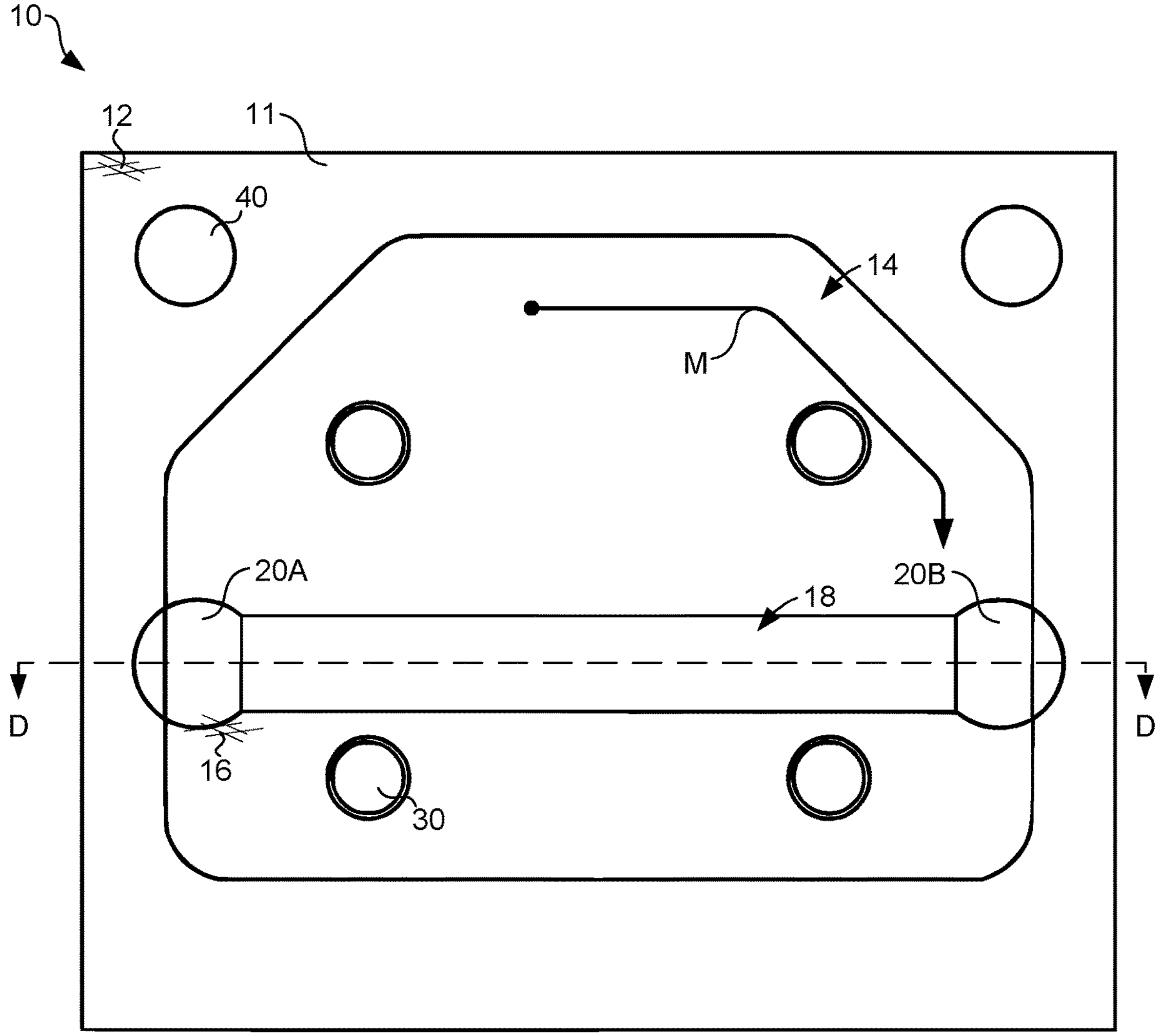
FIG. 7 illustrates a top-down view of the transitional housing after primary machining according to various embodiments of the present disclosure.

FIG. 7 illustrates a top-down view of the transitional housing 10 after a number of primary machining steps are performed on the housing block 11. The primary machining steps can include resurfacing one or more surfaces of the housing block 11, including the top surface of the housing block 11. For example, the top surface of the housing block 11, the first cylindrical plug 20A, and the second cylindrical plug 20B can be planed down to form the top surface 12 of the housing 10, although other stripping or surfacing techniques can be used.

The primary machining steps also include forming the cover recess 14 into the top surface 12 of the housing block 11. In one example, the milling can comprise climb milling that proceeds in the direction M, as shown in FIG. 7. The milling can also intersect with the cylindrical plugs 20A and 20B, as shown in FIG. 7. When a cover (not shown) is ultimately inserted and secured into the cover recess 14, the cylindrical plugs 20A and 20B can be locked into place by mechanical interference with the cover. The primary machining steps can also include forming the threaded hole 30 in the cover platform surface 16, the aperture 40 in the top surface 12 of the housing block 11, the threaded hole 50 in the right side surface 13 of the housing block 11, among other threaded holes, apertures, and other features of the housing 10. The threaded holes 30 and 50 can be formed using any suitable drilling and tapping tools, and the aperture 40 can be formed using any suitable drilling tools.

Figure 8:
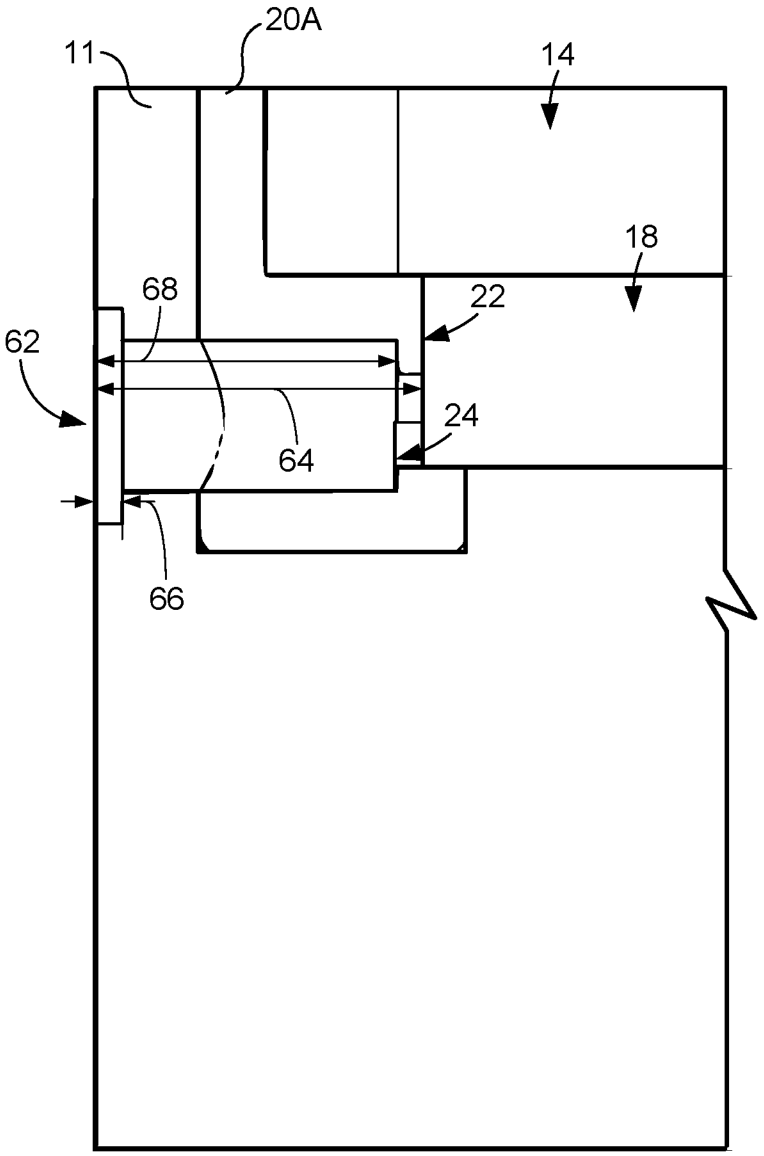
FIG. 8 illustrates a portion of the cross-section of the transitional housing designated as "D-D" in FIG. 7 according to various embodiments of the present disclosure.

The primary machining steps also include forming the feedthrough aperture 62 in the left side surface of the housing block 11 and forming the feedthrough aperture 60 in the right side surface 13 of the housing block 11. To show an example of the feedthrough aperture 62, FIG. 8 illustrates a cross-section designated as "D-D" in FIG. 7. The feedthrough aperture 62 is formed by a series of steps. The feedthrough aperture 62 comprises a coaxial conductor aperture 64 of a first width or diameter, a feedthrough hole 68 of a second width or diameter, and a feedthrough ring 66 of a third width or diameter. In one example, the coaxial conductor aperture 64 is formed first, followed by the feedthrough hole 68, and followed by the feedthrough ring 66, although those steps can be reversed in other cases. The feedthrough apertures 60 and 62 can vary in proportion, size, and style as compared to that shown in FIG. 8 among the embodiments. In one variation, the feedthrough ring 66 can be omitted. In other examples, the feedthrough apertures 60 and 62 can be formed using only one or two steps. The coaxial conductor aperture 64, feedthrough ring 66, and feedthrough hole 68 of the feedthrough aperture 62 can be formed by a series of drilling steps in one example, although other approaches can be relied upon.

As shown, the coaxial conductor aperture 64 is longer than the feedthrough hole 68, and the feedthrough hole 68 is longer than the feedthrough ring 66. Thus, the coaxial conductor aperture 64 extends into the housing block 11, into the cylindrical plug 20A, through the flat chord surface 24 of the cylindrical plug 20A, and through the flat chord surface 22 of the cylindrical plug 20A. The feedthrough hole 68 extends into the housing block 11, into the cylindrical plug 20A, and through the flat chord surface 24 of the cylindrical plug 20A. The feedthrough ring 66, extends only into the housing block 11.

The width or diameter of the feedthrough hole 68 is selected to correspond to the size of the coaxial feedthrough 72. That is, the width or diameter of the feedthrough hole 68 is selected to be substantially the same as the diameter of the coaxial feedthrough 72, to maintain a hermetic seal for the housing 10 in at least some embodiments.

Figure 9:
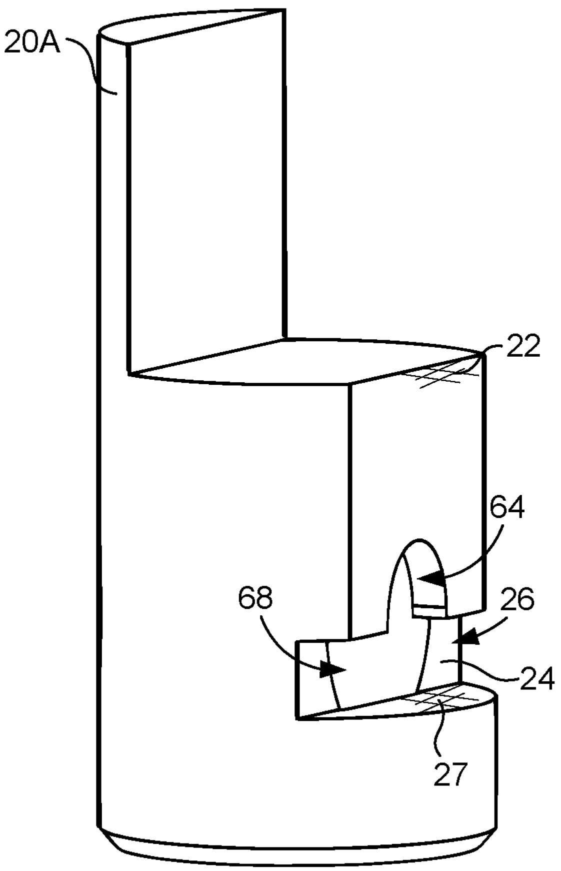
FIG. 9 illustrates an example cylindrical plug after primary machining of the transitional housing according to various embodiments of the present disclosure.

FIG. 9 illustrates the cylindrical plug 20A after primary machining of the transitional housing 10. As shown, the coaxial conductor aperture 64 extends through the flat chord surface 22 and the flat chord surface 24. The feedthrough hole 68 extends through the flat chord surface 24 of the cylindrical plug 20A but not through the flat chord surface 24. Thus, the semi-circular shape of the coaxial conductor aperture 64 is formed as described above.

One or more additional steps can be performed in the method of manufacturing the housing 10. For example, the housing block 11, with the cylindrical plugs 20A and 20B, can be plated after the primary machining steps. Additionally, after the housing 10 is formed, the coaxial feedthrough 72 can be inserted into the feedthrough aperture 62, and the coaxial feedthrough 70 can be inserted into the feedthrough aperture 60. The coaxial feedthroughs 70 and 72 can be press-fitted and, in some cases, soldered or otherwise secured in place with conductive epoxy or other means. The microstrip line 19 on the PCB can be inserted and secured to the bottom surface of the channel 18. The central conductors 71 and 73 of the coaxial feedthroughs 70 and 72 can be electrically coupled to the microstrip line 19. A cover (not shown) can be seated into the cover recess 14 and secured within the cover recess 14 using screws driven into the threaded holes 30. In some embodiments, the housing 10 can be designed to be hermetically sealed.

The PCB on which the microstrip line 19 is formed can also include one or more integrated semiconductor chips or devices, capacitors, inductors, resistors, and other devices mounted to it and electrically coupled to (or between) the microstrip line 19. In one example, the PCB can include a monolithic microwave integrated circuit (MMIC) electrically coupled to or between the microstrip line 19, although other integrated circuits can be mounted on the PCB.

Overall, the concepts and embodiments described above are designed to reduce the unwanted effects in coaxial-to-microstrip transitions. The cylindrical plugs 20A and 20B offer a manufacturing solution for the mechanical transitions to partially eliminate the unwanted impedance mismatch of the transition. The cylindrical plugs 20A and 20B also provide a mechanical path for TEM mode propagation for the coaxial-to-microstrip signal path transition. The embodiments described above substantially improve the quality of high frequency signals.

Terms such as “top,” “bottom,” “side,” “front,” “back,” “right,” and “left” are not intended to provide an absolute frame of reference. Rather, the terms are relative and are intended to identify certain features in relation to each other, as the orientation of structures can vary. The terms “comprising,” “including,” “having,” and the like are synonymous, are used in an open-ended fashion, and do not exclude additional elements, features, acts, operations, and so forth. Also, the term “or” is used in its inclusive sense, and not in its exclusive sense, so that when used, for example, to connect a list of elements, the term “or” means one, some, or all of the elements in the list. Disjunctive language, such as the phrase “at least one of X, Y, Z,” unless indicated otherwise, is used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any ranges described herein are used for convenience and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of “about 0.1% to about 5%” should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure. For example, the phrase “x to y” includes the range from “x” to “y” as well as the range greater than “x” and less than “y.” The range can also be expressed as an upper limit. For example, “about x, y, z, or less” and should be interpreted to include the specific ranges of “about x,” “about y,” and “about z,” as well as the ranges of “less than x,” “less than y,” and “less than z.” Likewise, the phrase “about x, y, z, or greater” should be interpreted to include the specific ranges of “about x,” “about y,” and “about z,” as well as the ranges of “greater than x,” “greater than y,” and “greater than z.” In some embodiments, the term “about” can include traditional rounding according to significant figures of the numerical value. In addition, the phrase “about ‘x’ to ‘y’”, where ‘x’ and ‘y’ are numerical values, includes “about ‘x’ to about ‘y’.”

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

What is claimed is:

1. A coaxial to microstrip transitional housing comprising:

a housing block comprising:
- a channel having parallel sidewalls;
- an annular opening at an end of the channel;

a cylindrical plug in the annular opening, the cylindrical plug comprising:
- a first flat chord surface positioned at the end of the channel, with the first flat chord surface extending perpendicularly between the parallel sidewalls of the channel; and
- a second flat chord surface set back from the end of the channel; and a feedthrough aperture that extends from outside the housing block, through the first flat chord surface of the cylindrical plug, through the second flat chord surface of the cylindrical plug, and into the end of the channel.

2. The transitional housing according to claim 1, wherein the housing block further comprises a second annular opening at a second end of the channel.

3. The transitional housing according to claim 2, further comprising a second cylindrical plug in the second annular opening.

4. The transitional housing according to claim 3, wherein the second cylindrical plug comprises a second flat chord surface positioned at the second end of the channel, with the second flat chord surface extending perpendicularly between the parallel sidewalls of the channel at the second end of the channel.

5. The transitional housing according to claim 3, further comprising a second feedthrough aperture that extends through the housing block, through the second flat chord surface of the second cylindrical plug, and into the second end of the channel.

6. The transitional housing according to claim 3, wherein the second cylindrical plug further comprises an undercut and a platform ledge.

7. The transitional housing according to claim 1, wherein the cylindrical plug further comprises an undercut and a platform ledge.

8. The transitional housing according to claim 7, wherein the platform ledge of the cylindrical plug is in a same plane as a bottom surface of the channel.

9. The transitional housing according to claim 1, wherein the housing block further comprises a recess formed in an outer surface of the housing block, the recess comprising a platform surface within the housing block.

10. The transitional housing according to claim 1, wherein:

the channel is formed to a first depth into the housing block;

the annular opening is formed to a second depth into the housing block; and the second depth is greater than the first depth.

11. The transitional housing according to claim 1, further comprising:

a coaxial feedthrough positioned within the feedthrough aperture; and a microstrip line formed on a printed circuit board, wherein:

the printed circuit board is positioned on a bottom surface of the channel;

the cylindrical plug further comprises an undercut and a platform ledge; and one end of the printed circuit board rests in part on the platform ledge of the cylindrical plug and abuts the coaxial feedthrough.

12. A transitional housing comprising:

a housing block comprising a channel having sidewalls;

a cylindrical plug positioned at an end of the channel, the cylindrical plug comprising a flat chord surface extending between the sidewalls of the channel; and a feedthrough aperture that extends through the housing block, through the plug, through the flat chord surface of the plug, and into the end of the channel.

13. The transitional housing according to claim 1, wherein the housing block further comprises a recess in an outer surface of the housing block, the recess comprising a platform surface.

14. The transitional housing according to claim 13, wherein:

the channel extends from the platform surface to a first depth in the housing block;

the plug extends from an outer surface of the housing block to a second depth in the housing block; and the second depth is greater than the first depth.

15. The transitional housing according to claim 12, further comprising a second cylindrical plug positioned at a second end of the channel, the second cylindrical plug comprising a second flat chord surface extending between the sidewalls of the channel at the second end of the channel.

16. The transitional housing according to claim 15, further comprising a second feedthrough aperture that extends through the housing block, through the second cylindrical plug, through the second flat chord surface of the second cylindrical plug, and into the second end of the channel.

17. The transitional housing according to claim 1, wherein:

the plug comprises a cylindrical plug; and the flat chord surface that extends perpendicularly between the sidewalls of the channel.

18. The transitional housing according to claim 12, further comprising:

a coaxial feedthrough positioned within the feedthrough aperture; and a microstrip line formed on a printed circuit board, wherein:

the printed circuit board is positioned on a bottom surface of the channel;

the cylindrical plug further comprises an undercut and a flat platform ledge; and one end of the printed circuit board rests in part on the flat platform ledge of the cylindrical plug and abuts the coaxial feedthrough.

19. A transitional housing, comprising:

a housing block comprising a channel having sidewalls;

a plug positioned at an end of the channel, the plug comprising a surface extending between the sidewalls of the channel; and a feedthrough aperture that extends through the housing block, through the plug, through the surface of the plug, and into the end of the channel, wherein the plug further comprises an undercut and a platform ledge.

20. The transitional housing according to claim 19, wherein the platform ledge of the plug is in a same plane as a bottom surface of the channel.

* * * * *